United States Patent [19]

Bolton

[11] E Re. 29,552

[45] Reissued Feb. 28, 1978

[54] MAGNETIC GAME STRUCTURE

[75] Inventor: Douglas R. Bolton, Palatine, Ill.

[73] Assignee: Cadaco, Inc., Chicago, Ill.

[21] Appl. No.: 519,127

[22] Filed: Oct. 30, 1974

Related U.S. Patent Documents

Reissue of:

[64] Patent No.: 3,734,502
Issued: May 22, 1973
Appl. No.: 149,646
Filed: Jun. 3, 1971

[51] Int. Cl.[2] ..... A63B 71/02; A63F 7/00

[52] U.S. Cl. ..... 273/95 R; 46/239; 273/1 M

[58] Field of Search ..... 46/45, 239, 240, 236; 273/1 M, 95 R, 102 R, 105 R, 115, 116, 121 A, 121 D, 127 R, 130 A, 130 B, 33

[56] References Cited

U.S. PATENT DOCUMENTS

| | | | |
|---|---|---|---|
| 2,339,209 | 1/1944 | Vensel | 273/1 M |
| 2,590,002 | 3/1952 | Frazier | 46/239 X |
| 2,998,973 | 9/1961 | Schaper | 273/1 M |
| 3,116,929 | 1/1964 | Kernodle | 273/1 M |
| 3,628,792 | 12/1971 | Frederick | 273/1 M |
| 3,653,662 | 4/1972 | Welbourn | 273/1 M |
| 3,743,288 | 7/1973 | Danklefsen | 273/1 M |

*Primary Examiner*—William H. Grieb
*Attorney, Agent, or Firm*—Wegner, Stellman, McCord, Wiles & Wood

[57] ABSTRACT

A game structure such as for play by several persons on a table testing the skill of the players relative to dropping markers into subjacent receivers. The markers may comprise magnetic elements with control of the movement thereof being effected by the user through the medium of a suitable magnet. The receivers are spaced at different distances from the playing surface so as to require corresponding increase in the skill of the players as a function of the spacing. The game may be provided with suitable scoring means correlated with the degree of skill involved with the different receivers. The game may include a plurality of sets of receivers to permit play by a corresponding plurality of different players.

30 Claims, 4 Drawing Figures

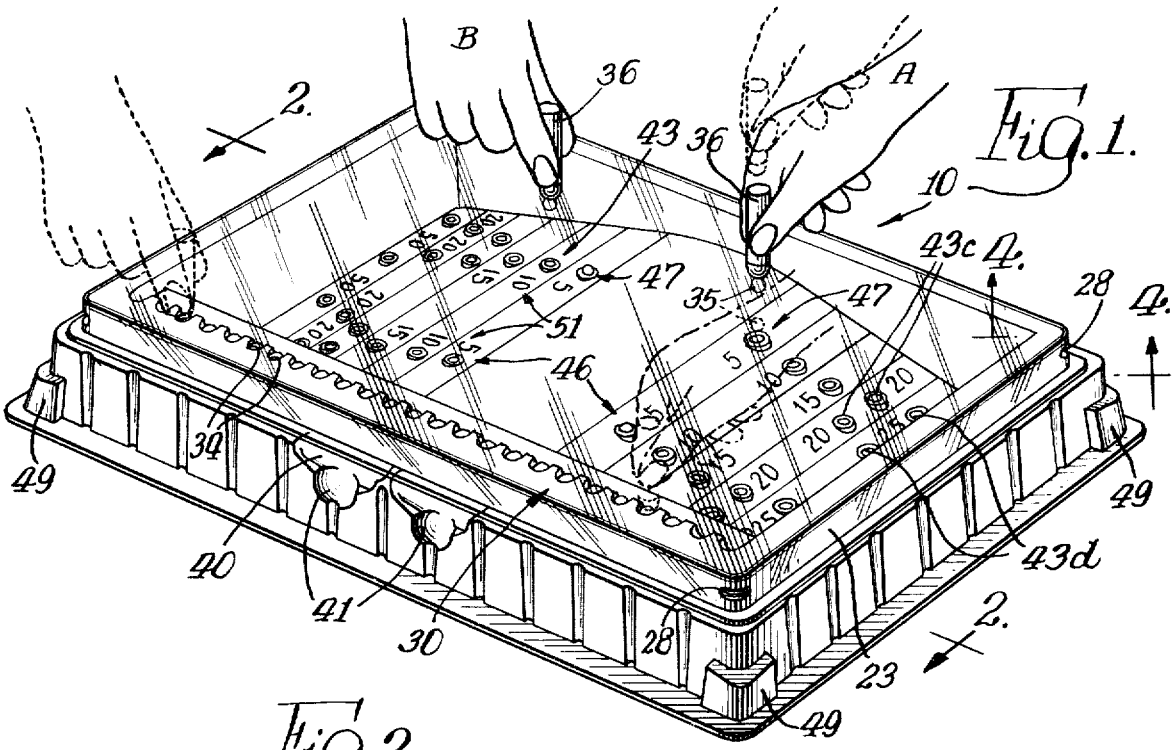
Fig. 1.
Fig. 2.
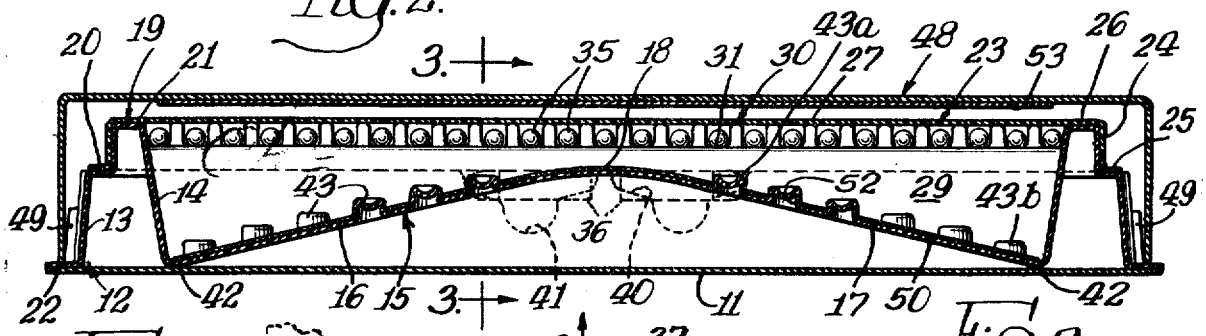
Fig. 3.
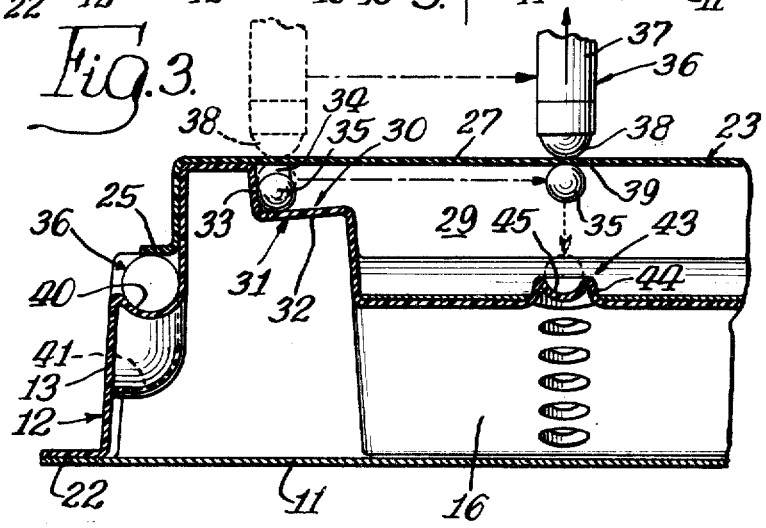
Fig. 4.
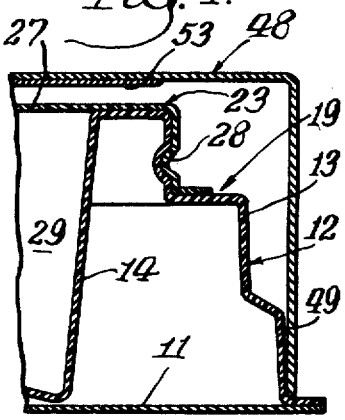
Inventor:-
Douglas R. Bolton
By Hofgren, Wegner, Allen, Stellman & McCord Attys

MAGNETIC GAME STRUCTURE

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to games and in particular to games which test the manual dexterity and skill of the players in controlling the droping of small elements.

2. Description of the Prior Art

A number of games has been developed utilizing magnetic devices for manually moving balls and like elements and permitting dropping of the elements under the control of the player. In one such game, a dome-shaped, upper surface element is provided along the underside of which a plurality of balls may be moved by the player by means of a magnet. The balls are receivable in movable receiving means carried on a flat base of the game. In another game generally of this type, the upper surface element comprises a flat element formed of a wire screen. In a further known game of this type, the movable elements are afforded a twisting motion by the control magnet.

In another form of such magnetically controlled ball movement games, the top surface element is inclined with the player moving the subjacent ball along the surface thereof into a top receiver.

In one prior art game, the receivers have different sizes.

SUMMARY OF THE INVENTION

The present invention comprehends an improved game structure wherein magnetic elements, such as balls, are selectively dropped into subjacent receivers with the different receivers being spaced below an upper horizontal flat surface different distances to provide a variation in the skill necessary to effect dropping of the elements thereinto. Means for scoring may be provided correlated with the degree of skill necessary to effect dropping of the elements into the different receivers.

A plurality of groups of receivers may be provided permitting playing of the game by a number of players concurrently. Means are provided for automatically restoring the elements to be dropped into a storage means for facilitated accessibility during the play of the game.

The game structure of the present invention is extremely simple and economical of construction while yet providing an improved game suitable for individual and group play testing the manual dexterity and skill of the players in a novel and simple manner.

BRIEF DESCRIPTION OF THE DRAWING

Other features and advantages of the invention will be apparent from the following description taken in connection with the accompanying drawing wherein:

FIG. 1 is a perspective view of a game structure embodying the invention illustrating the playing of the game with the player's hands illustrated in full lines as in position to drop the balls into subjacent receptacles and in dotted lines illustrating the transfer of the balls from a storage means to the position from which they are dropped in playing the game;

FIG. 2 is a longitudinally vertical section taken substantially along the line 2—2 of FIG. 1;

FIG. 3 is a fragmentary enlarged vertical section taken substantially along the line 3—3 of FIG. 2; and FIG. 4 is a fragmentary enlarged vertical section taken substantially along the line 4—4 of FIG. 1.

DESCRIPTION OF THE PREFERRED EMBODIMENT

In the exemplary embodiment of the invention as disclosed in the drawing, a game structure generally designated 10 is shown to comprise a base 11 carrying an upstanding peripheral wall 12 defined by an outer portion 13 and an inner portion 14. A mid-portion 15 extends inwardly from upstanding wall portion 14 across base 11, and as best seen in FIGS. 1 and 2, defines a pair of inclined flat portions 16 and 17 terminating in an uppermost apex portion 18. The upright wall portions 13 and 14 are joined by a stepped top wall generally designated 19 having a lower portion 20 and an uppermost portion 21. The lower end of the outer side wall portion 13 is outturned to define a peripheral flange 22 overlying the periphery of the base 11. The upper wall portion 21 defines a flat plane and carries a transparent sheet member 23 having a downturned rim portion 24 and a distal outturned portion 25. Thus, when the sheet member 23 is mounted on the wall 12, the periphery 26 of the flat upper portion 27 rests on the upper wall portion 21 and the outturned flange 25 thereof rests on the lower wall portion 20.

As shown in FIG. 1, the four corners of sheet member 23 may be crimped inwardly, as at 28, to lock the sheet member in place to have the flat top portion extend across the space 29 above mid-portion 15 of the lower wall structure.

As shown in FIGS. 2 and 3, one side 30 of the upright wall defines a shelf 31 subjacent the flat mid-portion 27 of sheet member 23 including a bottom wall portion 32 and an upright end wall portion 33. The upright end wall portion defines a plurality of horizontally opening recesses 34, each adapted to receive one of the movable elements of the game, herein comprising ferrous metal balls 35. As shown in FIG. 3, the bottom wall portion 32 is inclined downwardly toward end wall 33 thereby to bias the balls 35 toward the end wall 33 away from space 29. Bottom wall portion 32 is spaced below mid-portion 27 of the sheet member 23 a distance slightly greater than the diameter of the balls 35.

Balls 35 are manipulated in the playing of the game by means of a plurality of magnetic stick devices generally designated 36, each having a cylindrical handle portion 37 carrying at one end a magnet 38 which preferably has a rounded distal surface 39 for slidably engaging the flat portion 27 of the sheet member 23. The magnetic device 36 may be stored in suitable cylindrical recesses 40 provided in the outer portion 13 of the upstanding wall 12 defining the shelf structure 31. The outturned flange 25 of cover member 23 overlies space 40 to retain the magnetic devices 36 therein against accidental dislodgement. The recess 40 further defines a downwardly extending finger access portion 41 permitting the user to insert the end of his finger below the cylindrical magnetic device 36 and urge it outwardly from the cylindrical recess portion when desired.

As indicated briefly above, flat portion 16 and 17 of bottom wall mid-portion 15 are inclined toward the apex 18 with the lower ends 42 thereof substantially juxtaposed to the base 11. Upstanding from wall portions 16 and 17, respectively, is a plurality of upwardly opening receptacles 43, each of which comprises an outer cylindrical wall 44 and an inner substantially segmentally spherical wall 45 having a curvature generally similar to that of the balls 35. As seen in FIGS. 2 and 3, the receptacles 43 are spaced below the flat transparent top wall portion 27 different distances depending on their spacing between apex 18 and bottom portion 42 of the inclined wall portions 16 and 17. Thus, illustratively, the uppermost receptacle 43a is spaced closely subjacent the wall portion 27 whereas the lowermost receptacle 43b is spaced substantially below the wall portion 27 with the other receptacles being progressively further spaced from receptacle 43a toward receptacle 43b.

As best shown in FIG. 1, the upper receptacles may be spaced along a vertical plane parallel to the side wall 30. A plurality of lower receptacles may be provided at each different level illustratively comprising a pair of receptacles, such as receptacles 43c and 43d. The lowermost receptacles may be paired along vertical planes which divurge toward the lower end 42 of wall portions 16 and 17. As further shown in FIG. 1, two sets of receptacles generally designated 46 and 47 may be provided on each of the side wall portions 16 and 17.

The wall 12, including mid-portion 15, may be formed integrally as a plastic molding with the flange 22 thereof being congruent with and secured to the periphery of the base 11 by suitable means such as adhesive. The cover member 23 may be formed of a transparent sheet plastic suitably formed to define the edge portion 19. The game may be provided with a cover, such as cardboard cover 48, which seats on the outturned flange 22 of wall 12, as seen in FIG. 2, when the game is arranged in the storage disposition. As shown in FIG. 1, the four corners of the wall portion 13 may be provided with a boss 49 adapted to snugly receive the four corners of the cover 48.

A game board sheet 50 may be superposed on the upper surface of wall portions 16 and 17, as shown in FIG. 2, and may be provided with suitable scoring indicia coordinated with the receptacles 43, as shown in FIG. 1. As shown, the game board may be provided with suitable openings 52 through which the different receptacles project when the game board is superposed on the wall portions 16 and 17. The game board may be secured on the upper surface by such means as adhesive.

In playing the game of the present invention, the user firstly places the balls 35 one each in the recesses 34 on shelf 31. This is readily effected by merely tipping the game to bring the side wall 30 lowermost whereupon all of the balls fall into the shelf portion 31 with suitable swinging of the game in an upright position being effected to cause the balls to fall into the respective open recesses. Upon placement of one ball thusly in each of the recesses, the game is then turned to a horizontal arrangement, as shown in FIG. 1, and placed on a suitable support, such as a table. As the wall portions 32 are downwardly inclined, the balls remain in the recess slightly below the lower surface of the cover sheet 23. The balls are selectively withdrawn from the recess by the user firstly bringing the magnetic devices with the magnet element 38 lowermost over a selected ball, as shown in FIG. 3 in broken lines. The magnetic attraction of the magnet 38 causes the subjacent ball to be lifted upwardly to abut the lower surface of cover sheet portion 27. Lateral movement of the magnetic device 36 may now be effected to move the selected ball 36 laterally with the magnet 38 to a position overlying a selected one of the receptacles 43, as shown in full lines in FIG. 3. Raising of the magnetic devices by the user withdraws the magnetic force between magnet 38 and the ball 35, permitting the ball to fall downwardly, hopefully directly into the selected receptacles 43. If, however, the player has misaligned the ball relative to the receptacle, the ball will strike the side wall 44 of the receptacle and bounce away from the receptacle to be collected at the lower end 42 of the inclined lower wall. Depending on into which receptacle the player is attempting to drop the ball, different degrees of skill are required in effecting accurate alignment of the ball with the receptacle and release of the ball accurately downwardly from the aligned magnetically retained position into the receptacles. Thus, the scoring indicia 51 may be coordinated with the requirement of increasing skill by awarding a greater number of points for dropping of the ball into the lower receptacle.

The game may be played as a solitaire game with a single player competing with himself to test his skill by achieving the maximum score with a given number of balls. Alternatively, the game may be played as a competitive game in a number of different manners. In one form thereof, players may be positioned at opposite ends of the game so that upon the giving of a "Start" signal, each player may then attempt to drop balls quickly into this receptacle. The player scoring the highest total within a time limit may be designated the winner. Other alternate ways of playing the game may consist, for example, of each player using the same number of balls and progressing downwardly from the uppermost receptacle to the lowermost with the player having the lowermost ball retained in the receptacle winning the game. The game may be played serially by setting a goal score, such as 125, so that if, upon completion of each player using all of his balls, neither player has reached this goal, the balls are redeposited on the shelf and a second round commenced wherein the additional scores are added to the previous scores. The game may be played by groups as, for example, having each member of a group playing one ball at a time. As will be obvious to those skilled in the art, many other methods of playing the game may be utilized.

Thus, the game structure of the present invention provides an improved low cost game which provides a substantial test of the player's skill. The structure offers numerous possibilities for variation of use in playing different games therewith.

A suitable instruction sheet 53 may be provided on the underside of the cover 48, as shown in FIG. 2.

The foregoing disclosure of specific embodiments is illustrative of the broad inventive concepts comprehended by the invention.

I claim:

1. A game structure comprising: a flat, transparent panel; means for peripherally supporting said panel to extend horizontally; a plurality of magnetizable playing pieces; support means for receiving and removably storing said magnetizable playing pieces closely subjacent said panel; magnetic means for manipulation superjacent said panel for attracting said pieces, said support means being disposed sufficiently close to said panel to permit said magnetic means to attract said playing pieces on said support means seriatim with said panel disposed therebetween, and permitting lateral movement of said pieces from said support means along the underside of the panel as a result of corresponding lateral movement of said magnetic means along the top side of the panel; and a plurality of upwardly opening cup elements disposed in a preselected arrangement spaced at different distances below said panel adapted to catch a playing piece dropped respectively accurately into the center of the elements.

2. The game structure of claim 1 wherein all of said cup elements are fixedly positioned relative to said panel.

3. The game structure of claim 1 wherein said panel and said panel supporting means cooperatively define said support means for removably storing said magnetic means.

4. The game structure of claim 1 wherein at least three of said cup elements are spaced progressively at increasing distances from said panel along a preselected line.

5. The game structure of claim 1 wherein said support means comprises a shelf spaced subjacent one edge of said panel and adapted to receive and removably carry said playing elements.

6. The game structure of claim 1 wherein said storing means comprises a shelf spaced subjacent one edge of said panel and adapted to receive and removably carry said playing elements and means carried by said shelf for spacing said playing elements thereon.

7. A game structure comprising: a flat, transparent panel; means for peripherally supporting said panel to extend horizontally; a plurality of magnetizable playing pieces; means defining a plurality of recesses opening horizontally and upwardly subjacent said panel for receiving and removably storing said magnetizable playing pieces closely subjacent said panel; magnetic means for manipulation superjacent said panel for attracting said playing pieces, said support means being disposed sufficiently close to said panel to permit said magnetic means to attract said playing pieces in said recesses along the underside of the panel as a result of corresponding lateral movement of said magnetic means along the top side of the panel; a wall element spaced below said panel; and a plurality of upwardly opening cup elements on said wall element disposed in a preselected arrangement spaced at different distances below said panel adapted to catch a playing piece dropped respectively accurately into the center of the elements.

8. The game structure of claim 7 wherein said wall element extends angularly to the flat plane of said panel.

9. The game structure of claim 7 wherein said wall element defines a high portion subjacent the midportion of said panel and end portions extending downwardly from said high portion.

10. The game structure of claim 9 wherein said wall element end portions are substantially planar.

11. The game structure of claim 7 wherein said panel defines a transverse centerline, and said wall element and the spacing of said cup element below said panel are symmetrical about a transverse vertical plane defined by said transverse centerline of said panel.

12. A game structure comprising: a flat, transparent panel; means for peripherally supporting said panel to extend horizontally; a plurality of magnetizable playing pieces; means defining a plurality of recesses opening horizontally and upwardly subjacent said panel for receiving and removably storing said magnetizable playing pieces closely subjacent said panel; magnetic means for manipulation superjacent said panel for attracting said playing pieces, said support means being disposed sufficiently close to said panel to permit said magnetic means to attract said playing pieces in said recesses along the underside of the panel as a result of corresponding lateral movement of said magnetic means along the top side of the panel; a wall element spaced below said panel; and a plurality of upwardly opening cup elements on said wall element disposed in a preselected arrangement spaced below said panel adapted to catch a playing piece dropped respectively accurately into the center of the elements.

13. The game structure of claim 12 wherein said means defining a plurality of recesses includes means for spacing the playing pieces parallel to said panel.

14. The game structure of claim 12 wherein said means defining a plurality of recesses comprises a shelf spaced subjacent one edge of the panel.

15. The game structure of claim 12 wherein said means defining a plurality of recesses comprises a shelf spaced subjacent one edge of the panel and further defining a flat ledge extending parallel to the panel and toward the portion of the panel overlying the cup elements.

16. The game structure of claim 12 wherein said recesses are provided in a row along substantially one entire edge of the panel.

*17. A game structure comprising:*

*a panel defining an inner side and an outer side;*

*a plurality of magnetizable playing pieces;*

*means defining a plurality of recesses adjacent said panel opening parallel and toward said panel for receiving and removably storing said magnetizable playing pieces closely adjacent said panel;*

*magnetic means adapted for manipulation adjacent said panel for attracting said playing pieces, said means for receiving and storing said playing pieces being disposed sufficiently close to said panel to permit said magnetic means to attract said playing pieces in said recesses along the inner side of the panel, lateral movement of the playing pieces along the inner side of the panel being caused as a result of corresponding lateral movement of said magnetic means along the outer side of the panel; and*

*scoring means disposed for engagement by the moved playing pieces upon release thereof from said magnetic means.*

*18. The game structure of claim 17 wherein said means defining a plurality of recesses includes means for spacing the playing pieces apart a preselected distance to permit attraction of a single playing piece at a time by the magnetic means.*

*19. The game structure of claim 17 wherein said means defining a plurality of recesses comprises a shelf spaced adjacent one edge of the panel.*

*20. The game structure of claim 17 wherein said means defining a plurality of recesses comprises a shelf spaced adjacent one edge of the panel and further defines a flat ledge extending parallel to the panel.*

*21. The game structure of claim 17 wherein said recesses are provided in a row along one edge of the panel.*

*22. The game structure of claim 17 wherein said panel and recess defining means further cooperatively define a channel extending along one edge of the panel and opening parallel to the panel away from said edge, said channel and recesses opening upwardly to receive said playing pieces as an incident of tipping of the game structure to dispose said one edge lowermost.*

*23. The game structure of claim 17 wherein said panel is flat.*

*24. The game structure of claim 17 wherein said panel is transparent.*

*25. The game structure of claim 17 wherein said scoring means is spaced inwardly of said panel.*

*26. The game structure of claim 17 wherein said moved playing pieces are delivered from said magnetic means to said scoring means by a movement inwardly away from said panel.*

*27. The game structure of claim 17 wherein said panel and recess defining means further cooperatively define a channel opening parallel to the panel, said recesses opening into said channel to receive said playing pieces one each as an incident of tipping of the game structure to dispose said channel to open upwardly.*

*28. The game structure of claim 17 wherein said panel and recess defining means further cooperatively define a channel opening parallel to the panel, said recesses opening into said channel to receive said playing pieces one each as an incident of tipping of the game structure to dispose said channel to open upwardly, said playing pieces being spherical, said recesses being arranged in a row and having a depth approximately the diameter of said spherical playing pieces whereby the respective playing pieces may roll on top of previously deposited playing pieces in said recesses in moving longitudinally through said channel to be received in empty recesses of said row.*

*29. The game structure of claim 17 wherein said panel and recess defining means further cooperatively define a channel opening parallel to the panel, said recesses opening into said channel to receive said playing pieces one each as an incident of tipping of the game structure to dispose said channel to open upwardly, said playing pieces being spherical, said recesses being arranged in a row and having a depth slightly less than the diameter of said spherical playing pieces whereby the respective playing pieces may roll on top of previously deposited playing pieces in said recesses in moving longitudinally through said channel to be received in empty recesses of said row.*

*30. The game structure of claim 17 wherein the means defining the recesses and the scoring means are formed integrally as a plastic molding.*

* * * * *